(No Model.)

F. H. SHAW.
MANUFACTURE OF BRICKS MADE OF GLASS.

No. 302,289. Patented July 22, 1884.

WITNESSES:
W. G. Button
George F. Whitlock

INVENTOR
Francis H. Shaw
BY
Harding
ATTORNEY

UNITED STATES PATENT OFFICE.

FRANCIS H. SHAW, OF NEWARK, NEW JERSEY.

MANUFACTURE OF BRICKS MADE OF GLASS.

SPECIFICATION forming part of Letters Patent No. 302,289, dated July 22, 1884.

Application filed April 28, 1884. (No model.)

*To all whom it may concern:*

Be it known that I, FRANCIS H. SHAW, a citizen of the United States, residing at Newark, county of Essex, and State of New Jersey, have invented a certain new and useful Improvement in the Manufacture of Bricks Made of Glass and other Similar Material, of which the following is a true and exact description, reference being had to the accompanying drawings, which form part of this specification.

In the use of bricks made of glass, the mortar which is now used in laying clay bricks has no effect in preventing the movement of bricks of this class. In clay bricks the mortar forms with the clay in the bricks a chemical combination, causing an adhesion at the joints between the layers or surfaces of the two bricks. I propose to cast glass bricks in such a manner that the front or glass brick shall present to each other and to the inner or solid wall surfaces adapted for the reception and holding of mortar, so as to prevent the glass brick from moving from each other and from the inner or solid wall.

Figure 1:
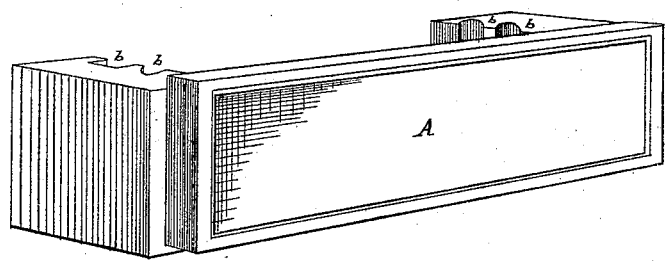
Figure 2:
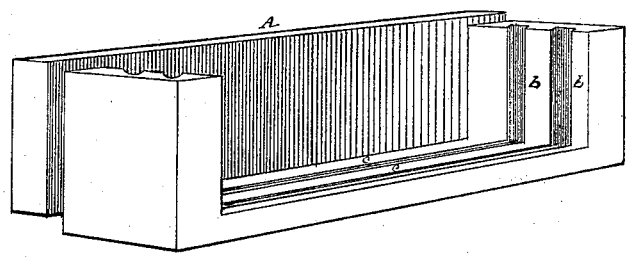
Figure 3:
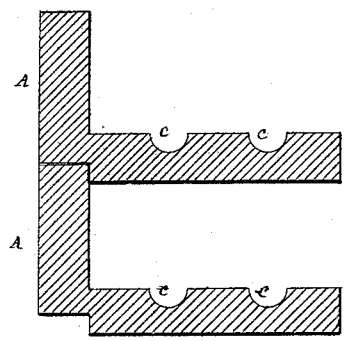

In the drawings, Figure 1 represents an exterior view in perspective of one of my bricks. Fig. 2 represents an interior view in perspective of one of my bricks. Fig. 3 represents a vertical section of two tiers of bricks.

I construct my bricks in the following manner: The bricks are cast with the panel or front face, A, projecting beyond the sides of the brick, so as to form a surface, against which the face of the next brick can rest and overlap, so as virtually to form one brick, the crevice being filled with mortar. This face may be made to project only at one end beyond the sides of the brick. This panel must either project above or below for the same purpose as shown above.

On the interior of the sides of my bricks I cast one or more grooves, as shown in Figs. 1 and 2, letters *b b*. One or more grooves, *c c*, are also cast in the interior bottom of my bricks. In these grooves the mortar rests, and the solid brick of the inner wall rests on this mortar, thus preventing any movement between the outer or glass wall and the inner or solid wall.

I do not intend to limit myself to the specific arrangement shown in the drawings; but

What I claim, and desire to protect by Letters Patent, is—

1. Hollow bricks made of glass or similar substances, the panel or front face of which projects beyond the side or sides of the brick, substantially as and for the purposes specified 2. Bricks made of glass or similar substances, having cast upon the inner surfaces of their sides and bottoms one or more grooves, substantially as and for the purposes specified.

3. Bricks made of glass or similar substances, the panel or front face of which projects beyond the side or sides of the brick, in combination with one or more grooves upon the inner surfaces of its sides and bottom, substantially as and for the purposes specified.

In witness whereof I have hereunto set my hand.

FRANCIS H. SHAW.

Witnesses:
W. G. BUTTON,
A. B. STEVENS.